United States Patent Office 2,961,346
Patented Nov. 22, 1960

2,961,346

COATED POLYETHYLENE STRUCTURE

John E. Dereich, Painesville, Ohio, assignor to Diamond Alkali Company, Cleveland, Ohio, a corporation of Delaware No Drawing. Filed May 26, 1958, Ser. No. 737,526

25 Claims. (Cl. 117—138.8)

This invention relates to printing and stenciling polyethylene structures, and more particularly to a composition which may be used in the printing and stenciling of polyethylene without the necessity for subjecting the polyethylene to a precoating surface treatment.

As is well known, polyethylene is a solid polymer consisting of polymerized ethylene, which polymer is chemically inert to contact with inorganic acid and alkalies, either in the cold or at temperatures of 80–90° C. Such polymer is also insoluble in many solvents such as water, ethanol, amyl alcohol, ethyl ether, acetone, chloroform, and glycerin. It is also compatible with drying oils, such as linseed oil, and with nitro cellulose.

Recently, there has been devised a process wherein polyethylene is extruded from a mill to form a thin-walled, seamless tubing which is collected in a flattened state, on a reel. Because of the aforementioned properties of polyethylene, such tubing is admirably suitable for use as a packaging material, such as for example, envelopes, bags, pouches, etc. Similarly, self-sustaining sheeting of polyethylene is also admirably suitable for packaging and wrapping purposes.

Up to the present time, the use of polyethylene film, either in the form of sheeting or seamless tubing, as a wrapping or packaging material has been restricted. A packaging or wrapping material, in order to attain extensive and wide-spread use, must be of the type and nature so that various indicia, particularly trademarks, advertising indicia, recipes, etc., can be imprinted thereon, and the dried ink impression will firmly adhere thereto and effectively resist removal upon abrasion and other treatments to which printed film will be subjected during its life, i.e., from the time it is printed until it reaches the consumer or user of the contents wrapped or packaged therein. Because of the paraffin-like surface properties and the other previously-mentioned properties, polyethylene in the form of a film cannot be satisfactorily printed with the general inks of the oil or lacquer types normally used for printing or stenciling non-fibrous cellulosic materials. When polyethylene film is so printed or stenciled, the dried ink impressions do not adhere firmly to the polyethylene surface. Slight abrasion, such as gentle scraping with the back of the fingernail removes the dried ink impression with very little effort. Also, when such printed or stenciled film is stretched, the ink cracks and practically falls off. As a consequence, during the useful life of the printed film as a wrapping material, the dried ink impressions are more or less removed and the package presents an unattractive appearance.

It has heretofore been proposed to overcome the above-mentioned difficulties by subjecting the polyethylene to various surface treating operations, prior to the application of the ink or stencil thereto. For example, it has been proposed to subject the surface of the polyethylene to the action of gaseous chlorine, thereby forming a chlorinated polyethylene surface upon which both printing inks and stenciling will adhere to a greater degree than on the untreated surface. It has also been proposed to treat the polyethylene with a saturated solution of sodium dichromate in concentrated sulfuric acid, thereby rendering the surface of the polyethylene hydrophilic and thus receptive to printing and stenciling inks. Additional processes which have been proposed have involved flame treatment, heat treatment, and electronic treatment of the polyethylene.

Although all of the above treatments, as well as various others which have been proposed, have been effective to at least some degree, in making the surface of the polyethylene receptive to printing and stenciling inks, it is readily seen that any treatment to which the polyethylene must be subjected, prior to printing or stenciling, increases the cost of manufacturing the polyethylene, thereby restricting, to at least some extent, its usability as a low cost packaging material. Additionally, these treatments tend to change the properties of the polyethylene somewhat, thereby making it more reactive with inorganic alkalies and acids, as well as even weakening the structure of the polyethylene itself.

It is therefore an object of the present invention to provide a composition with which polyethylene may be printed or stenciled without the necessity of subjecting the polyethylene to a surface treatment.

A further object of the present invention is to provide a composition of the above type, which composition is not readily removable from the polyethylene under ordinary conditions of use and abrasion.

A further object of this invention is to provide a coating composition as described above, which composition when applied to polyethylene, is flexible enough so as not to be removed therefrom when the polyethylene is subjected to twisting and bending during ordinary use.

These and other objects will become apparent to those skilled in the art from the description of the invention which follows.

It has now been found that a composition containing a major amount of a chlorinated paraffin and minor amounts of at least one of the following: film-forming agents, plasticizers, "slip" agents, and dryers, and having incorporated therein a small amount of an oil-soluble dye or a pigment, all dispersed in a suitable solvent, is readily applied to a polyethylene surface without first subjecting the polyethylene surface to a precoating treatment.

The composition of the present invention includes a major portion of a highly chlorinated aliphatic material, preferably averaging from 18–36 carbon atoms in the molecule thereof and containing from about 66–80% of chemically combined chlorine, a minor amount of a film-forming agent, and lesser amounts of at least one of the following: plasticizers, "slip" agents, and dryers. The highly chlorinated aliphatic material comprises highly chlorinated aliphatic hydrocarbons and mixtures thereof, such as chlorinated paraffin wax containing 66–80% of chemically combined chlorine and having an average molecular weight corresponding to a $C_{24}$ carbon atom chain, chlorinated to the extent indicated, excellent results being achieved by using specifically a chlorinated paraffin wax having the empirical formula, $C_{24}H_{29}Cl_{21}$.

The film-forming agent in the present composition is preferably polyvinyl acetate, which material has been found to be completely compatible with the solvents which are necessary for use in printing inks. However, other materials such as polyvinyl stearate and the acrylic ester resins may also be used with equally good results. As plasticizers, in the present composition, the following have been found to be satisfactory: butyl benzyl phthalate, sodium modified alkyd resins, such as those containing phthalic anhydride, polyvinyl stearate, and the sorbitan monolaurates such as polyoxyethylene sorbitan monolaurate. Cobalt naphthanate and lead naphthanate have been found to be satisfactory dryers. Additionally, it has been found desirable to incorporate in the present composition small amounts of materials which will give a better "slip" to the printing or stenciling, i.e., give the printing or stenciling on the polyethylene a smooth feel to the touch, such as one of the various silicone resins. Where the polyethylene printed or stenciled with the composition of the present invention is to be used for extended periods in exposure to direct sunlight, it has been found desirable to incorporate therein a material which will absorb the ultraviolet rays, thereby preventing a discoloration of the chlorinated paraffin material. Exemplary of such materials are the substituted benzophenones, such as 2-hydroxy-4-methoxy benzophenone, 2-hydroxy-4,4'-dimethoxy benzophenone, and 2,2'-dihydroxy-4,4'-dimethoxy benzophenone.

By the term "film-forming agent," as used in the specification and claims, is meant a material which in admixture with the chlorinated paraffinic material and a solvent, upon removal of the solvent, will cause the formation of a smooth, hard layer of the chlorinated paraffinic material, in a very short time. Examples of such materials have been shown above. The purpose of a plasticizer in the present composition is to give the above layer which is formed a flexibility, thereby permitting stretching of the polyethylene material without cracking the printed or stenciled layer. The hardening or drying of this printed layer is accelerated by the use of the dryers, i.e., lead and cobalt naphthanate, as set forth above. Although these materials are conventional dryers, frequently used in paints, the mechanics of their action in the present composition is not known, inasmuch as there are no double bonds which may be oxidized to speed up drying, as is the case with paints. However, without these dryers present, the final hardening of the coating is lengthened by several minutes.

In the present composition, the chlorinated paraffin is present in amounts ranging from 60–85% by weight of the total composition, the preferred range being 79–80% by weight of the total composition. The polyvinyl acetate film-forming agent is present in amounts ranging from 10–40% by weight of the total composition, with the preferred range being 19–20%. The remaining ingredients, i.e., plasticizers, dryers, and "slip" agents, are present in a total amount from about 1–5% by weight of the total composition, preferably 1–2%. Additionally, it has been found, that where polyvinyl stearate is used as the film-forming agent, a very satisfactory printing composition may be made using as little as about 1% by weight of the total composition of the polyvinyl stearate and the remainder of the composition being the chlorinated paraffinic material. When an ultraviolet absorbing agent is incorporated in the present composition, it is used in amounts of about .1–1% by weight of the total composition, .1–.5% by weight being the preferred range.

In order to render the above composition, which is a solid composition, suitable for printing or stenciling on polyethylene, it is dissolved in any suitable solvent so as to make a solution containing about 5–80% by weight of the above composition, 40–65% being the preferred amount. It will be recognized that the type of solvent used will vary according to whether the composition is to be used for printing or stenciling polyethylene material, a faster drying solvent being desired for stenciling applications. At the present time, for stenciling, toluene is the preferred solvent, although other solvents such as kerosene, xylene, naphthalene, trichlorethylene, and perchlorethylene may also be used. Exemplary of slower drying solvents which may be used with the present composition for printing applications is ethylene glycol monobutyl ether acetate. However, it is believed that other suitable solvents will be readily apparent to those skilled in the art, the only criteria being that the solvent be compatible with the materials of the present composition.

The coloring materials for use in the present composition are suitably oil-soluble dyes and pigments. Examples of oil-soluble dyes which may be used in the present invention are Oil yellow CI19, Oil red CI258, Sudan black B, Sudan blue GL, and Sudan green BB. These materials are preferably added to the solvent composition in the amount of about .02 mg. per 100 ml. of solution. An example of a pigment which may be incorporated in the present composition is titanium dioxide; however, other similar pigments which will give different colors are also suitable. The pigment is preferably incorporated in the solvent composition of the present invention in the amount of about 10% by weight of the total composition.

The composition of the present invention may be applied to polyethylene by printing thereon or by stenciling, the stenciling being done by brushing, dipping, or air spraying. Additionally the compositions of the present invention have been found to be compatible with the ordinary aerosol propellants and solvents, such as methylene chloride, and the fluorinated lower hydrocarbons commonly known as Freons, and hence, the present composition, in stencil use, may be applied by means of aerosol spraying.

Although it is believed from the foregoing description that those skilled in the art will be readily able to formulate the composition of the present invention, in order to more clearly describe this composition, the following specific examples are offered:

Example I

A dry mixture is made having the following composition in parts by weight:

| | Parts by weight |
|---|---|
| Chlorinated paraffin wax (containing 70% by weight chemically combined chlorine) | 80 |
| Polyvinyl acetate | 19.5 |
| Soya modified alkyd resin [1] (containing 70% solids by weight and carrying 23% phthalic anhydride) | .5 |

[1] General Electric Co. Resin #2466.

40 parts by weight of the above mixture is added to 60 parts by weight of toluene, and the resulting mixture is agitated until all of the solids are dissolved in the toluene. To this solution is added in the amount of .02 mg. per 100 ml. of solution, the oil-soluble dye, Oil yellow CI19. This material is then air sprayed on a polyethylene film, and a glossy, hard, flexible, yellow film is produced within 60 seconds of application.

Example II

A dry mixture is made having the following composition in parts by weight:

| | Parts by weight |
|---|---|
| Chlorinated paraffin wax (containing 70% by weight of chemically combined chlorine) | 78.75 |
| Polyvinyl acetate | 17.5 |
| Butyl benzyl phthalate [1] | 3.625 |
| Silicone resin [2] | .125 |

[1] Sanitizer 160.
[2] Dow Corning F-121.

40 parts by weight of the above composition is added to 60 parts by weight of toluene, and the resulting mixture is agitated until all of the solids are dissolved in the toluene. To this solution is added in the amount of .02 mg. per 100 ml. of solution, the oil-soluble dye, Oil red CI258. This material is then air sprayed on a polyethylene film, and a glossy, hard, flexible, red film is produced within 60 seconds of application.

Example III

A dry mixture is made having the following composition in parts by weight:

| | Parts by weight |
|---|---|
| Chlorinated paraffin wax (containing 70% by weight of chemically combined chlorine) | 79.15 |
| Polyvinyl acetate | 18.125 |
| Butyl benzyl phthalate [1] | 1.00 |
| Silicone resin [2] | .125 |
| Soya modified alkyd resin [3] (containing 70% solids by weight and carrying 23% phthalate anhydride) | .5 |
| Lead naphthanate | .25 |
| Cobalt naphthanate | .25 |

[1] Sanitizer 160.
[2] Dow Corning F-121.
[3] General Electric Co. Resin #2466.

40 parts by weight of the above composition is added to 60 parts by weight of toluene, and the resulting mixture is agitated until all of the solid material is dissolved. To this solution is added in the amount of .02 mg. per 100 ml. of solution, the oil-soluble dye, Sudan black B. This material is then air sprayed on a polyethylene film, and a glossy, hard, flexible, black film is produced within 60 seconds of application.

Example IV

A dry mixture having the following composition in parts by weight is made:

| | Parts by weight |
|---|---|
| Chlorinated paraffin wax (containing 70% by weight of chemically combined chlorine) | 79.9 |
| Polyvinyl acetate | 19.0 |
| Silicone resin [1] | .10 |
| Polyvinyl stearate | 1.00 |

[1] Dow Corning F-121.

40 parts by weight of the above mixture is added to 60 parts by weight of toluene, and the resulting mixture is agitated until all of the solid components are dissolved. To this solution is added in the amount of .02 mg. per 100 ml. of solution, the oil-soluble dye, Sudan blue GL. This material is then air sprayed on a polyethylene film, and a glossy, hard, flexible, blue film is produced within 60 seconds of application.

Example V

A dry mixture is made having the following composition in parts by weight:

| | Parts by weight |
|---|---|
| Chlorinated paraffin wax (containing 70% by weight of chemically combined chlorine) | 80 |
| Polyvinyl acetate | 19 |
| Silicone resin [1] | .125 |
| Cobalt naphthanate | .200 |
| Lead naphthanate | .200 |
| Polyoxyethylene sorbitan monolaurate | .475 |

[1] Dow Corning F-121.

40 parts by weight of the above composition is added to 60 parts by weight of toluene, and the resulting mixture is agitated until all solid material is dissolved. To this solution is added in the amount of .02 mg. per 100 ml. of solution, the oil-soluble dye, Sudan green BB. This material is then air sprayed on a polyethylene film, and a glossy, hard, flexible, green film is produced within 60 seconds of application.

Example VI

A dry mixture is made having the following composition in parts by weight:

| | Parts by weight |
|---|---|
| Chlorinated paraffin wax (containing 70% by weight of chemically combined chlorine) | 99 |
| Polyvinyl stearate | 1 |

40 parts by weight of the above composition is added to 60 parts by weight of toluene, and the resulting mixture is agitated until all of the solid components are dissolved. To this solution is added 10% by weight of the solution of ground titanium dioxide pigment. The resulting mixture is air sprayed on a polyethylene film, and a glossy, hard, flexible, white film is produced within 60 seconds of application.

Example VII

A dry mixture is made having the following composition in parts by weight:

| | Parts by weight |
|---|---|
| Chlorinated paraffin wax (containing 70% by weight of chemically combined chlorine) | 80 |
| Acrylic ester resin [1] | 20 |

[1] Designated by manufacturer, Rohm and Haas Co., as Acryloid Resin B-82.

40 parts by weight of the above composition is added to 60 parts by weight of toluene, and the resulting mixture is agitated until all of the solid components are dissolved. To this solution is added 10% by weight of the solution of ground titanium dioxide pigment. The resulting mixture is air sprayed on a polyethylene film, and a glossy, hard, flexible, white film is produced within 60 seconds of application.

Example VIII

The coated polyethylene films from Examples I–VII are placed in an accelerated weathering unit, designated by the manufacturer, the National Carbon Company as Model X-1-A. This apparatus comprises an enclosed copper tank which surrounds a carbon arc lamp which is the source of radiation. The coated samples are placed in the tank on racks and are rotated around the arc lamp. Periodically, the samples are subjected to a stream of water from two spray nozzles. The samples are rotated at the rate of one revolution every 118 minutes or about ½ a revolution per hour. The test is continued for 7 days, 24 hours a day or a total of 168 hours. This time is equivalent to exposing the samples out of doors for 168 days. At the expiration of this time, the colored coating on the polyethylene film is still found to adhere thereto even though the polyethylene itself has begun to deteriorate.

From the above it can be seen that the composition of the present invention is readily applicable to polyethylene, without the necessity of subjecting the polyethylene to a surface treatment in order to modify the surface, so as to make it more receptible to printing inks or stenciling compositions. When applied to the polyethylene, the present composition adheres thereto and is not removed even under the extremely adverse conditions which are experienced in the accelerated weathering unit. It is believed that the advantages of the present printing or stenciling composition which may be placed on polyethylene without first subjecting the polyethylene to a surface-modifying treatment, will be readily apparent to those skilled in the art.

It is to be understood that although the invention has been described with specific reference to particular embodiments thereof, it is not to be so limited since changes and alterations therein may be made which are within

What is claimed is:

1. A coated article comprising a polyethylene structure coated with a composition comprising a major amount of a chlorinated paraffin wax containing 66–80% by weight of chemically combined chlorine and having 18–36 carbon atoms in a molecule thereof, a minor amount of a film-forming agent, and small but effective amounts of at least one of a plasticizer, a dryer, and a "slip" agent, and a compound selected from the group consisting of oil-soluble dyes and pigments.

2. The structure as claimed in claim 1 wherein the film-forming agent is polyvinyl acetate.

3. A coated article comprising a polyethylene structure coated with a composition comprising 60–85% by weight of the total composition of a chlorinated paraffin wax containing 66–80% of chemically combined chlorine and having from 18–36 carbon atoms in the molecule thereof, 10–40% by weight of the total composition of polyvinyl acetate as a film-forming agent, 0–5% by weight of the total composition of a plasticizer, and 0–5% by weight of a total composition of a dryer and 0–5% by weight of a total composition of a "slip" agent, and a compound selected from the group consisting of oil-soluble dyes and pigments.

4. A coated article comprising a polyethylene structure coated with a composition comprising 79–80% by weight of the total composition of a chlorinated paraffin wax containing 66–80% of chemically combined chlorine and having from 18–36 carbon atoms in the molecule thereof, 19–20% by weight of the total composition of polyvinyl acetate as a film-forming agent, 0–20% by weight of the total composition of a plasticizer, 0–2% by weight of the total composition of a dryer, and 0–2% by weight of the total composition of a "slip" agent, and a compound selected from the group consisting of oil-soluble dyes and pigments.

5. A coated article comprising a polyethylene structure coated with a composition having the following components in parts by weight:

| | Parts by weight |
|---|---|
| Chlorinated paraffin wax (containing 70% by weight of chemically combined chlorine) | 80.0 |
| Polyvinyl acetate | 19.5 |
| Soya modified alkyd resin (containing 70% solids by weight and carrying 23% phthalic anhydride) | 0.5 | and an oil-soluble dye in the amount of 0.02 mg. of dye per 100 parts by weight of the entire composition.

6. A coated article comprising a polyethylene structure coated with a composition having the following components in parts by weight:

| | Parts by weight |
|---|---|
| Chlorinated paraffin wax (containing 70% by weight of chemically combined chlorine) | 80.0 |
| Polyvinyl acetate | 19.5 |
| Soya modified alkyd resin (containing 70% solids by weight and carrying 23% phthalic anhydride) | 0.5 | and a pigment in the amount of 10% by weight of the total composition.

7. A coated article comprising a polyethylene structure coated with a composition having the following components in parts by weight:

| | Parts by weight |
|---|---|
| Chlorinated paraffin wax (containing 70% by weight of chemically combined chlorine) | 78.75 |
| Polyvinyl acetate | 17.5 |
| Butyl benzyl phthalate | 3.625 |
| Silicone resin | 0.125 | and an oil-soluble dye in the amount of 0.02 mg. of dye per 100 parts by weight of the total composition.

8. A coated article comprising a polyethylene structure coated with a composition having the following components in parts by weight:

| | Parts by weight |
|---|---|
| Chlorinated paraffin wax (containing 70% by weight of chemically combined chlorine) | 78.75 |
| Polyvinyl acetate | 17.5 |
| Butyl benzyl phthalate | 3.625 |
| Silicone resin | 0.125 | and a pigment in the amount of 10% by weight of the total composition.

9. A coated article comprising a polyethylene structure coated with a composition having the following components in parts by weight:

| | Parts by weight |
|---|---|
| Chlorinated paraffin wax (containing 70% by weight of chemically combined chlorine) | 79.15 |
| Polyvinyl acetate | 18.125 |
| Butyl benzyl phthalate | 1.00 |
| Silicone resin | 0.125 |
| Soya modified alkyd resin (containing 70% solids by weight and carrying 23% phthalate anhydride) | 0.5 |
| Lead naphthanate | 0.25 |
| Cobalt naphthanate | 0.25 | and an oil-soluble dye in the amount of 0.02 mg. of dye per 100 parts by weight of the total composition.

10. A coated article comprising a polyethylene structure coated with a composition having the following components in parts by weight:

| | Parts by weight |
|---|---|
| Chlorinated paraffin wax (containing 70% by weight of chemically combined chlorine) | 79.15 |
| Polyvinyl acetate | 18.125 |
| Butyl benzyl phthalate | 1.00 |
| Silicone resin | 0.125 |
| Soya modified alkyd resin (containing 70% solids by weight and carrying 23% phthalate anhydride) | 0.5 |
| Lead naphthanate | 0.25 |
| Cobalt naphthanate | 0.25 | and a pigment in the amount of 10% by weight of the total composition.

11. A coated article comprising a polyethylene structure coated with a composition having the following components in parts by weight:

| | Parts by weight |
|---|---|
| Chlorinated paraffin wax (containing 70% by weight of chemically combined chlorine) | 79.9 |
| Polyvinyl acetate | 19.0 |
| Silicone resin | 0.10 |
| Polyvinyl stearate | 1.00 | in an oil-soluble dye in the amount of 0.02 mg. of dye per 100 parts by weight of the total composition.

12. A coated article comprising a polyethylene structure coated with a composition having the following components in parts by weight:

| | Parts by weight |
|---|---|
| Chlorinated paraffin wax (containing 70% by weight of chemically combined chlorine) | 79.9 |
| Polyvinyl acetate | 19.0 |
| Silicone resin | 0.10 |
| Polyvinyl stearate | 1.00 | and a pigment in the amount of 10% by weight of the total composition.

13. A coated article comprising a polyethylene structure coated with a composition having the following components in parts by weight:

| | Parts by weight |
|---|---|
| Chlorinated paraffin wax (containing 70% by weight of chemically combined chlorine) | 80.0 |
| Polyvinyl acetate | 19.0 |
| Silicone resin | 0.125 |
| Cobalt naphthanate | 0.200 |
| Lead naphthanate | 0.200 |
| Polyoxyethylene sorbitan monolaurate | 0.475 | and an oil-soluble dye in the amount of 0.02 mg. of dye per 100 parts by weight of the total composition.

14. A coated article comprising a polyethylene structure coated with a composition having the following components in parts by weight:

| | Parts by weight |
|---|---|
| Chlorinated paraffin wax (containing 70% by weight of chemically combined chlorine) | 80.0 |
| Polyvinyl acetate | 19.0 |
| Silicone resin | 0.125 |
| Cobalt naphthanate | 0.200 |
| Lead naphthanate | 0.200 |
| Polyoxyethylene sorbitan monolaurate | 0.475 | and a pigment in the amount of 10% by weight of the total composition.

15. A coated article comprising a polyethylene structure coated with a composition having the following components in parts by weight:

| | Parts by weight |
|---|---|
| Chlorinated paraffin wax (containing 70% by weight of chemically combined chlorine) | 99.0 |
| Polyvinyl stearate | 1.0 | and an oil-soluble dye in the amount of 0.02 mg. of dye per 100 parts by weight of the total composition.

16. A coated article comprising a polyethylene structure coated with a composition having the following components in parts by weight:

| | Parts by weight |
|---|---|
| Chlorinated paraffin wax (containing 70% by weight of chemically combined chlorine) | 99.0 |
| Polyvinyl stearate | 1.0 | and a pigment in the amount of 10% by weight of the total composition.

17. A coated article as claimed in claim 1 wherein there is incorporated from 0.1–1.0% by weight of the coating composition of an ultraviolet absorbing agent.

18. A coated article as claimed in claim 3 wherein there is incorporated from 0.1–1.0% by weight of the coating composition of an ultraviolet absorbing agent.

19. The coated article as claimed in claim 4 wherein there is incorporated from 0.1–1.0% by weight of the coating composition of an ultraviolet absorbing agent.

20. A coated article comprising a polyethylene structure coated with a composition having the following components in parts by weight:

| | Parts by weight |
|---|---|
| Chlorinated paraffin wax (containing 70% by weight of chemically combined chlorine) | 80.0 |
| Acrylic ester resin | 20.0 | and an oil-soluble dye in the amount of 0.02 mg. of dye per 100 parts by weight of the total composition.

21. A coated article comprising a polyethylene structure coated with a composition having the following components in parts by weight:

| | Parts by weight |
|---|---|
| Chlorinated paraffin wax (containing 70% by weight of chemically combined chlorine) | 80.0 |
| Acrylic ester resin | 20.0 | and a pigment in the amount of 10% by weight of the total composition.

22. A method of forming a coated article which comprises applying to the surface of a polyethylene structure a composition comprising a major amount of a chlorinated paraffin wax containing 66–80% by weight of chemically combined chlorine and having 18–36 carbon atoms in the molecule thereof, a minor amount of a film-forming agent, and small but effective amounts of at least one of a plasticizer, a dryer, and a "slip" agent, and a compound selected from the group consisting of oil-soluble dyes and pigments, said composition being dispersed in a suitable solvent, and removing the solvent from said composition, so as to form a dry, adherent coating on the surface of said polyethylene structure.

23. The method as claimed in claim 22 wherein the film-forming agent is polyvinyl acetate.

24. A method of forming a coated article which comprises applying to the surface of a polyethylene structure a composition comprising from 60–85% by weight of the total composition of a chlorinated paraffin wax containing 66–80% of chemically combined chlorine and having from 18–36 carbon atoms in the molecule thereof, 10–40% by weight of the total composition of polyvinyl acetate as a film-forming agent, 0–5% by weight of the total composition of a plasticizer, 0.5% by weight of the total composition of a dryer, and 0–5% by weight of the total composition of a "slip" agent and a compound selected from the group consisting of oil-soluble dyes and pigments, 5–80% by weight of said composition being dispersed in 20–95% by weight of a suitable solvent and removing the solvent from said composition so as to form a dry, adherent coating on the surface of said polyethylene structure.

25. A method of forming a coated article which comprises applying to the surface of a polyethylene structure a composition comprising from 79–80% by weight of the total composition of a chlorinated paraffin wax containing 66–80% by weight of a chemically combined chlorine and having from 18–36 carbon atoms in the molecule thereof, 19–20% by weight of the total composition of polyvinyl acetate as a film-forming agent, 0–2% by weight of the total composition of a plasticizer, 0–2% by weight of the total composition of a dryer, and 0–2% by weight of the total composition of a "slip" agent, and a compound selected from the group consisting of oil-soluble dyes and pigments, 40–65% by weight of said composition being dispersed in 35–60% by weight of a suitable solvent, and removing the solvent from said composition, so as to form a dry, adherent coating on the surface of said polyethylene structure.

References Cited in the file of this patent

UNITED STATES PATENTS

| 2,502,841 | Henderson | Apr. 4, 1950 |
|---|---|---|
| 2,536,349 | Brush | Jan. 2, 1951 |
| 2,618,574 | Paulic | Nov. 18, 1952 |
| 2,639,998 | Paulic | May 26, 1953 |
| 2,715,075 | Wolinski | Aug. 9, 1955 |

UNITED STATES PATENT OFFICE
CERTIFICATION OF CORRECTION

November 22, 1960

Patent No. 2,961,346

John E. Dereich

It is hereby certified that error appears in the above numbered patent requiring correction and that the said Letters Patent should read as corrected below.

Column 7, line 33, for "0-20%" read -- 0-2% --.

Signed and sealed this 9th day of May 1961.

(SEAL)
Attest:

ERNEST W. SWIDER
Attesting Officer

DAVID L. LADD
Commissioner of Patents